United States Patent
Resendes et al.

(10) Patent No.: US 8,084,526 B2
(45) Date of Patent: *Dec. 27, 2011

(54) SILICA-FILLED ELASTOMERIC COMPOUNDS

(75) Inventors: Rui Resendes, Corunna (CA); Kevin Kulbaba, Sarnia (CA)

(73) Assignee: Lanzess Inc., Sarnia, Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,569

(22) Filed: May 13, 2010

(65) Prior Publication Data

US 2010/0317765 A1    Dec. 16, 2010

Related U.S. Application Data

(63) Continuation of application No. 11/791,494, filed as application No. PCT/CA2005/001889 on Dec. 13, 2005, now Pat. No. 7,741,391.

(60) Provisional application No. 60/636,838, filed on Dec. 16, 2004.

(51) Int. Cl.
*C08K 5/16*    (2006.01)

(52) U.S. Cl. .......................................... 524/186

(58) Field of Classification Search ............... 524/186
See application file for complete search history.

(56) References Cited

U.S. PATENT DOCUMENTS

| | | | |
|---|---|---|---|
| 5,688,860 A * | 11/1997 | Croft | 524/710 |
| 5,717,022 A | 2/1998 | Beckmann et al. | |
| 6,444,734 B1 | 9/2002 | Hergenrother et al. | |
| 7,741,391 B2 * | 6/2010 | Resendes et al. | 524/186 |
| 2002/0156173 A1 * | 10/2002 | Hopkins et al. | 524/492 |
| 2003/0139515 A1 * | 7/2003 | Asami et al. | 524/457 |

FOREIGN PATENT DOCUMENTS

| | | |
|---|---|---|
| CA | 2279085 | 1/2001 |
| CA | 2293149 | 6/2001 |
| CA | 2339080 | 9/2002 |
| CA | 2393927 | 1/2003 |
| CA | 2459884 | 3/2003 |
| CA | 2368363 | 7/2003 |
| EP | 0546516 | 9/1996 |
| EP | 0738755 | 3/1999 |

(Continued)

OTHER PUBLICATIONS

European Search Report of corresponding application, EP 05819613.0, issued May 4, 2009, consisting of 8 pages.

Marchurat, J., et al., "How to increase the properties of a bromobutyl based inner linear by the use of precipitated silica?", Kautschuk Gummi Kunststoffe, 45(1), 40-46, Coden: Kgukac, ISSN: 0022-9520, 1992.

(Continued)

*Primary Examiner* — Milton I Cano
*Assistant Examiner* — John Uselding
(74) *Attorney, Agent, or Firm* — Michael A. Miller

(57) ABSTRACT

The present invention provides compositions containing halobutyl elastomers, at least one mineral filler and at least one oligomeric polyol compound or mixture of at least one oligomeric polyol compound and an additive which contains at least one hydroxyl group and at least one functional group having a basic amine group.

The present invention also provides a process for preparing silica reinforced elastomer compounds with improved scorch safety including admixing halobutyl elastomers, at least one silica mineral filler and at least one oligomeric polyol compound or mixture of at least one oligomeric polyol compound and an additive which contains at least one hydroxyl group and at least one functional group having a basic amine group and curing the resulting filled halobutyl elastomer mixture.

16 Claims, 2 Drawing Sheets

Mooney Scorch, Examples 1 – 6

| | FOREIGN PATENT DOCUMENTS | |
|---|---|---|
| EP | 0733673 | 1/2000 |
| EP | 1236766 | 5/2006 |
| WO | 97/14748 | 4/1997 |
| WO | 03/020813 | 3/2003 |
| WO | WO 03/020813 * | 3/2003 |
| WO | 2005/056664 | 6/2005 |

OTHER PUBLICATIONS

Stephens, Howard L.; "The Compounding and Vulcanization of Rubber", Rubber Technology, Chapter 2, 3rd Ed. Chapman & Hall, 1995.

* cited by examiner

SILICA-FILLED ELASTOMERIC COMPOUNDS

This application is a continuation of U.S. patent application Ser. No. 11/791,494 filed Mar. 3, 2008, now U.S. Pat. No. 7,741,391 (371 Completion date: Mar. 3, 2008), which is a National Stage Entry of PCT/CA2005/001889 filed Dec. 13, 2005, which claims priority to U.S. Provisional Application No. 60/636,838 filed Dec. 16, 2004, all incorporated herein by reference.

FIELD OF THE INVENTION

The present invention relates to silica-filled halogenated butyl elastomers, such as bromobutyl elastomers (BIIR). Further, the present invention also relates to bromobutyl elastomers with improved scorch safety.

BACKGROUND OF THE INVENTION

It is known that reinforcing fillers such as carbon black and silica greatly improve the strength and fatigue properties of elastomeric compounds. It is also known that chemical interaction occurs between the elastomer and the filler. For example, good interaction between carbon black and highly unsaturated elastomers such as polybutadiene (BR) and styrene butadiene copolymers (SBR) occurs because of the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 shows that it is possible to produce filled butyl elastomer compositions with improved properties by combining halobutyl elastomers with silica and specific silanes. These silanes act as dispersing and bonding agents between the halogenated butyl elastomer and the filler. However, one disadvantage of the use of silanes is the evolution of alcohol during the process of manufacture and potentially during the use of the manufactured article produced by this process. Additionally, silanes significantly increase the cost of the resulting manufactured article.

Co-pending Canadian Patent Application 2,339,080 discloses filled halobutyl elastomeric compounds containing certain organic compounds having at least one basic nitrogen-containing group and at least one hydroxyl group enhance the interaction of halobutyl elastomers with carbon-black and mineral fillers, resulting in improved compound properties such as tensile strength and abrasion (DIN).

Co-pending Canadian Patent Application 2,368,363 discloses filled halobutyl elastomer compositions comprising halobutyl elastomers, at least one mineral filler and at least one silazane compound. However, due to the low flashpoint of certain silazane compounds, such as HMDZ, the search for additional processing aids for use in silica filled butyl compounds is ongoing.

SUMMARY OF THE INVENTION

The present invention provides compositions containing halobutyl elastomers, at least one mineral filler and at least one oligomeric polyol compound or mixture of at least one oligomeric polyol compound and an additive which contains at least one hydroxyl group and at least one functional group having a basic amine group.

The present invention also provides a process for preparing silica reinforced elastomer compounds with improved scorch safety including admixing halobutyl elastomers, at least one silica mineral filler and at least one oligomeric polyol compound or mixture of at least one oligomeric polyol compound and an additive which contains at least one hydroxyl group and at least one functional group having a basic amine group and curing the resulting filled halobutyl elastomer mixture.

Surprisingly, it has been discovered that oligomeric polyol compounds enhance the interaction of halobutyl elastomers with mineral fillers, resulting in improved compound properties such as tensile strength and abrasion (DIN) while displaying improved scorch safety.

Additionally, it has been found that mixtures of oligomeric polyols and an additive containing at least one hydroxyl group and a functional group containing a basic amine enhance the interaction of halobutyl elastomers with mineral fillers, resulting in improved compound properties such as tensile strength and abrasion resistance (DIN).

DETAILED DESCRIPTION OF THE INVENTION

Figure 1:
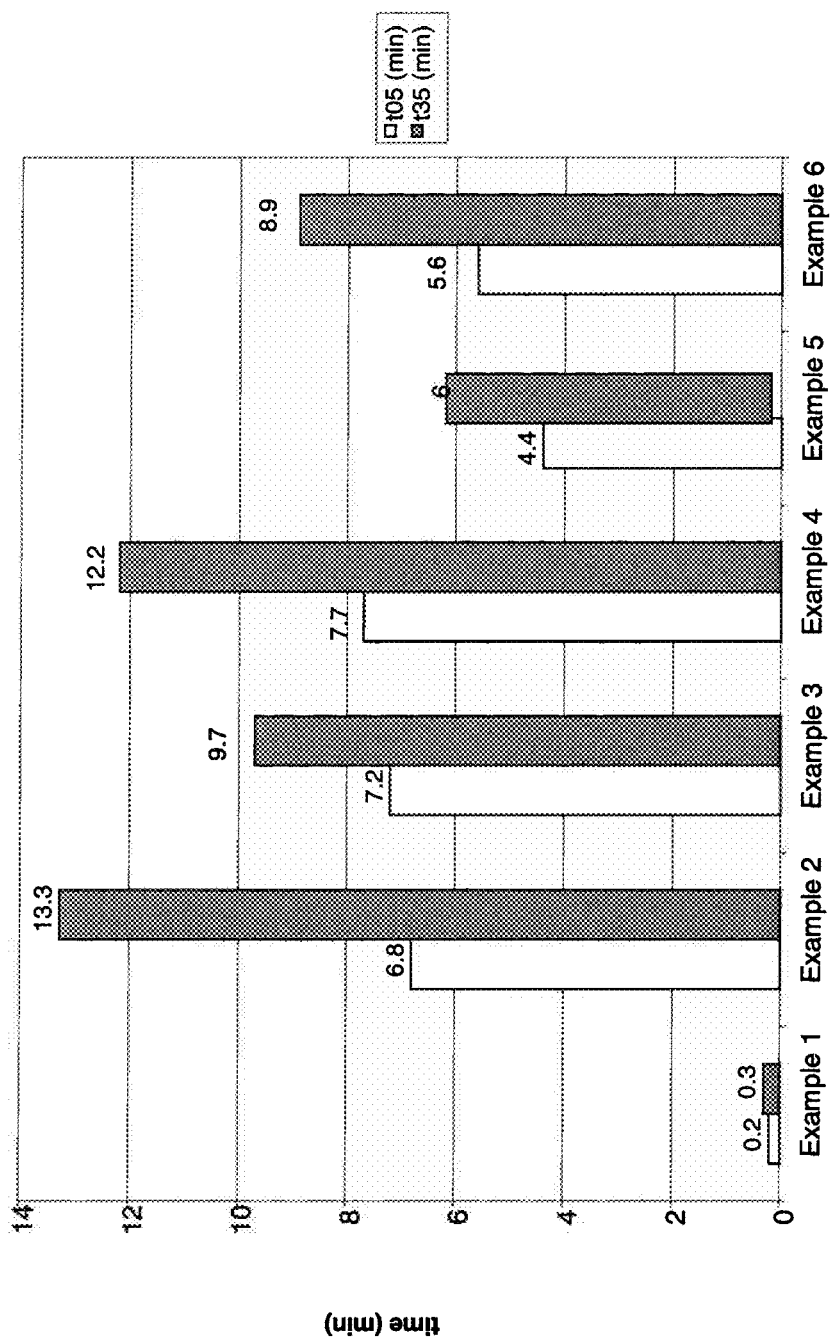
FIG. 1 is a graph of the Mooney Scorch of comparative filled elastomeric compounds and filled compounds according to the present invention.

The phrase "halobutyl elastomer(s)" as used herein refers to a chlorinated or brominated butyl elastomer. Brominated butyl elastomers are preferred, and the present invention is illustrated, by way of example, with reference to bromobutyl elastomers. It should be understood, however, that the present invention extends to the use of chlorinated butyl elastomers.

Halobutyl elastomers suitable for use in the present invention include, but are not limited to, brominated butyl elastomers. Such elastomers may be obtained by bromination of butyl rubber, which is a copolymer of an isoolefin, usually isobutylene and a co-monomer that is usually a $C_4$ to $C_6$ conjugated diolefin, preferably isoprene. Co-monomers other than conjugated diolefins can be used, such as alkyl-substituted vinyl aromatic co-monomers which includes $C_1$-$C_4$-alkyl substituted styrene. An example of a halobutyl elastomer which is commercially available is brominated isobutylene methylstyrene copolymer (BIMS) in which the co-monomer is p-methylstyrene.

Brominated butyl elastomers may contain in the range of from 0.1 to 10 weight percent, preferably 0.5 to 5 weight percent of repeating units derived from diolefin, preferably isoprene, and in the range of from 90 to 99.9 weight percent, preferably 95 to 99.5 weight percent of repeating units derived from isoolefin, preferably isobutylene, based upon the hydrocarbon content of the polymer, and in the range of from 0.1 to 9 weight percent, preferably 0.5 to 2.5 weight percent and more preferably from 0.75 to 2.3 weight percent bromine, based upon the bromobutyl polymer. A typical bromobutyl polymer has a molecular weight, expressed as the Mooney viscosity according to DIN (Deutsche Industrie Norm) 53 523 (ML 1+8 at 125° C.), in the range of from 25 to 60.

A stabilizer may be added to the brominated butyl elastomer. Suitable stabilizers include calcium stearate and epoxidized soy bean oil, preferably used in an amount in the range of from 0.5 to 5 parts by weight per 100 parts by weight of the brominated butyl rubber (phr).

Examples of suitable brominated butyl elastomers include Bayer Bromobutyl 2030, Bayer Bromobutyl 2040 (BB2040), and Bayer Bromobutyl X2 commercially available from Lanxess Corporation. Bayer BB2040 has a Mooney viscosity (ML 1+8 @ 125° C.) of 39±4, a bromine content of 2.0±0.3 wt % and an approximate molecular weight of 500,000 grams per mole.

The brominated butyl elastomer used in the process of the present invention may also be a graft copolymer of a brominated butyl rubber and a polymer based upon a conjugated diolefin monomer. Co-pending Canadian Patent Application 2,279,085 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The bromobutyl elastomer of the graft copolymer can be any of those described above. The conjugated diolefins that can be incorporated in the graft copolymer generally have the structural formula:

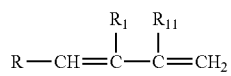

wherein R is a hydrogen atom or an alkyl group containing from 1 to 8 carbon atoms and wherein $R_1$ and $R_{11}$ can be the same or different and are selected from hydrogen atoms or alkyl groups containing from 1 to 4 carbon atoms. Suitable conjugated diolefins include 1,3-butadiene, isoprene, 2-methyl-1,3-pentadiene, 4-butyl-1,3-pentadiene, 2,3-dimethyl-1, 3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene being more preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, should be copolymerizable with the conjugated diolefin monomers being employed. Generally, any vinyl aromatic monomer, which is known to polymerize with organo alkali metal initiators, can be used. Such vinyl aromatic monomers usually contain in the range of from 8 to 20 carbon atoms, preferably from 8 to 14 carbon atoms. Examples of suitable vinyl aromatic monomers include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

According to the present invention, halogenated butyl elastomer may be used alone or in combination with other elastomers such as:
  BR—polybutadiene;
  ABR—butadiene/$C_1$-$C_4$ alkyl acrylate copolymers;
  CR—polychloroprene;
  IR—polyisoprene;
  SBR—styrene/butadiene copolymers with styrene contents of 1 to 60, preferably 20 to 50 wt. %;
  IIR—isobutylene/isoprene copolymers;
  NBR—butadiene/acrylonitrile copolymers with acrylonitrile contents of 5 to 60, preferably 10 to 40 wt. %;
  HNBR—partially hydrogenated or completely hydrogenated NBR; or
  EPDM—ethylene/propylene/diene copolymers.

Fillers according to the present invention are composed of particles of a mineral, suitable fillers include silica, silicates, clay (such as bentonite), gypsum, alumina, titanium dioxide, talc and the like, as well as mixtures thereof.

Further examples of suitable fillers include:
  highly disperse silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as Al, Mg, Ca, Ba, Zn, Zr and Ti;
  synthetic silicates, such as aluminum silicate and alkaline earth metal silicate;
  magnesium silicate or calcium silicate, with BET specific surface areas of 20 to 400 m$^2$/g and primary particle diameters of 10 to 400 nm;
  natural silicates, such as kaolin and other naturally occurring silica;
  glass fibers and glass fiber products (matting, extrudates) or glass microspheres;
  metal oxides, such as zinc oxide, calcium oxide, magnesium oxide and aluminum oxide;
  metal carbonates, such as magnesium carbonate, calcium carbonate and zinc carbonate;
  metal hydroxides, e.g. aluminum hydroxide and magnesium hydroxide
or combinations thereof.

Because these mineral particles have hydroxyl groups on their surface, rendering them hydrophilic and oleophobic, it is difficult to achieve good interaction between the filler particles and the butyl elastomer. For many purposes, the preferred mineral is silica, especially silica prepared by the carbon dioxide precipitation of sodium silicate.

Dried amorphous silica particles suitable for use as mineral fillers in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica has a BET surface area, measured in accordance with DIN 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially available under the trademarks HiSil 210, HiSil 233 and HiSil 243 available from PPG Industries Inc. Also suitable are Vulkasil S and Vulkasil N, commercially available from Bayer AG.

Mineral fillers can also be used in combination with known non-mineral fillers, such as
  carbon blacks; suitable carbon blacks are preferably prepared by the lamp black, furnace black or gas black process and have BET specific surface areas of 20 to 200 m²/g, for example, SAF, ISAF, HAF, FEF or GPF carbon blacks;

or rubber gels, preferably those based on polybutadiene, butadiene/styrene copolymers, butadiene/acrylonitrile copolymers and polychloroprene.

Non-mineral fillers are not normally used as filler in the halobutyl elastomer compositions of the present invention, but in some embodiments they may be present in an amount up to 40 phr. It is preferred that the mineral filler should constitute at least 55% by weight of the total amount of filler. If the halobutyl elastomer composition of the present invention is blended with another elastomeric composition, that other composition may contain mineral and/or non-mineral fillers.

According to the present invention the oligomeric polyol compound can be any oligomeric polyol known in the art. Suitable oligomeric polyol compounds include polypropylene oxide derivatives of trimethylolpropane and polypropylene oxide derivatives of ethylene diamine. Additional, oligomeric polyol compounds useful in the present invention may include derivatives of polyethylene oxide (PEO), polyethylene glycol (PEG), amino terminated polyethylene glycol (PEG-NH2), polypropylene oxide (PPO), so called pluronics (copolymers of PEO and PPO), polypropylene glycol (PPG), polypropylene glycol bis(2-amino-propyl ether) (PPG-NH2), poly(N-isopropylacrylamide) (polyNIPA) and copolymers thereof. Combinations of the aforementioned oligomers may also be used.

The amount of oligomeric polyol incorporated into the halobutyl elastomer can vary. Typically between 0.1 parts and 4 parts by weight is added, preferably from 0.2 parts to 2 parts, and more preferably from 0.4 to 1 part of the oligomeric polyol per hundred parts of the halobutyl elastomer is added.

Examples of additives, which give enhanced physical properties to mixtures of halobutyl elastomers, filler and oligomeric proteins, aspartic acid, 6-aminocaproic acid, diethanolamine and triethanolamine. Preferably, the additive containing at least one hydroxyl group and a functional group containing a basic amine should also contain a primary alcohol group and an amine group separated by methylene bridges, which may be branched. Such compounds have the general formula HO-A-NH$_2$; wherein A is a C1 to C20 alkylene group, which may be linear or branched.

More preferably, the number of methylene groups between the two functional groups should be in the range of from 1 to 4. Examples of preferred additives include monoethanolamine and N,N-dimethyaminoalcohol.

The amount of filler to be incorporated into the halobutyl elastomer can vary between wide limits. Typical amounts of filler range from 20 parts to 250 parts by weight, preferably from 30 parts to 100 parts, more preferably from 40 to 80 parts per hundred parts of elastomer. The amount of the additive containing at least one hydroxyl group and a functional group containing a basic amine used in conjunction with the polyol compound is typically in the range of from 0.5 to 10 parts per hundred parts of elastomer, preferably of from 1 to 3 parts per hundred parts of elastomer.

Furthermore up to 40 parts of processing oil, preferably from 5 to 20 parts, per hundred parts of elastomer, may be present. Further, a lubricant, for example a fatty acid such as stearic acid, may be present in an amount up to 3 parts by weight, more preferably in an amount up to 2 parts by weight.

According to the present invention, a bromobutyl elastomer, silica particles, a oligomeric polyol compound or a polyol/additive containing at least one hydroxyl group and a functional group containing a basic amine mixture and, optionally, a processing oil extender are mixed on a two-roll mill at a nominal mill temperature of 25° C. The mixed compound is then placed on a two-roll mill and mixed at a temperature above 60° C. It is preferred that the temperature of the mixing is not too high, and more preferably does not exceed 150° C., since higher temperatures may cause curing to proceed undesirably far and thus impede subsequent processing. The product of mixing these four ingredients at a temperature not exceeding 150° C. is a compound which has good stress/strain properties and which can be readily processed further on a warm mill with the addition of curatives.

The filled halobutyl rubber compositions of the present invention, and preferably filled bromobutyl rubber compositions have many uses, preferably in tire tread compositions. Important features of a tire tread composition are low rolling resistance, good traction, particularly in the wet, and good abrasion resistance so that it is resistant to wear. Compositions of the present invention display these desirable properties. Thus, an indicator of traction is tan δ at 0° C., with a high tan δ at 0° C. correlating with good traction. An indicator of rolling resistance is tan δ at 60° C., with a low tan δ at 60° C. correlating with low rolling resistance. Rolling resistance is a measure of the resistance to forward movement of the tire, and low rolling resistance is desired to reduce fuel consumption. Low values of loss modulus at 60° C. are also indicators of low rolling resistance. As is demonstrated in the examples below, compositions of the present invention display high tan δ at 0° C., low tan δ at 60° C. and low loss modulus at 60° C.

The halobutyl elastomer, which is admixed with at least one mineral filler and at least one oligomeric polyol compounds or mixture of at least one oligomeric polyol compound and an additive which contains at least one hydroxyl group and at least one functional group having a basic amine group, may also be in a mixture with another elastomer or elastomeric compound. The halobutyl elastomer should constitute more than 5% of any such mixture. Preferably, the halobutyl elastomer should constitute at least 10% of any such mixture. In some cases it is preferred not to use mixtures but to use the halobutyl elastomer as the sole elastomer. If mixtures are to be used, the other elastomer may be, for example, natural rubber, polybutadiene, styrene-butadiene or poly-chloroprene or an elastomer compound containing one or more of these elastomers.

The filled halobutyl elastomer according to the present invention can be cured to obtain a product, which has improved properties, such as improved abrasion resistance, rolling resistance and traction. Curing can be effected with sulfur. The preferred amount of sulfur is in the range of from 0.3 to 2.0 parts by weight per hundred parts of rubber. An activator, for example zinc oxide, may also be used, in an amount in the range of from 0.5 parts to 2 parts by weight. Other ingredients, for instance stearic acid, antioxidants, or accelerators may also be added to the elastomer prior to curing. Sulphur curing is then effected in any known manner. See, for example, "Rubber Technology", chapter 2, "The Compounding and Vulcanization of Rubber" (3$^{rd}$ ed., Chapman & Hall, 1995).

Other curatives known to cure halobutyl elastomers may also be used. Such known curatives include bis dieneophiles. Suitable bis dieneophiles include m-phenyl-bis-maleinimide and m-phenylene-bis-maleimide (HVA2). Other suitable compounds that are known to cure halobutyl elastomers include phenolic resins, amines, amino acids, peroxides, zinc oxide and the like. Combinations of the aforementioned curatives may also be used.

The mineral filled halobutyl elastomer of the present invention can also be admixed with other elastomers or elastomeric compounds before it is subjected to curing with sulphur.

The invention is further illustrated but is not intended to be limited by the following examples in which all parts and percentages are by weight unless otherwise specified.

EXAMPLES

Raw Materials

| Compound | Supplier |
| --- | --- |
| Bayer ® Bromobutyl ™ 2030 | LANXESS Inc. |
| Taktene ™ 1203-G1 | LANXESS Corp. |
| Buna ™ CB 25 | Lanxess Corp. |
| Modifier V100 | Bayer AG |
| Modifier 4050 | Bayer AG |
| Hexamethyldisilazane (HMDZ) | Aldrich |
| HiSil 233 | PPG Industries |

-continued

| Compound | Supplier |
| --- | --- |
| Dimethylethanolamine (DMAE) | Aldrich |
| Carbon Black, N 234 Vulcan 7 | Cabot Industries |
| Stearic Acid Emersol 132 NF | Acme Hardesty Co |
| Calsol 8240 | R. E. Carrol Inc. |
| Sunolite 160 Prills | Witco Corp. |
| Vulkanox ™ HS/LG | LANXESS Corp. |
| Sulfur (NBS) | NIST |
| Vulkacit ™ NZ/EG-C (CBS) | LANXESS Corp. |
| Zinc Oxide | St. Lawrence Chemical Co. |

Testing:

Hardness and Stress Strain Properties were determined with the use of an A-2 type durometer following ASTM D-2240 requirements. The stress strain data was generated at 23° C. according to the requirements of ASTM D-412 Method A. Die C dumbbells cut from 2 mm thick tensile sheets (cured for tc90+5 minutes at 160° C.) were used. DIN abrasion resistance was determined according to test method DIN 53516. Sample buttons for DIN abrasion analysis were cured at 160° C. for tc90+10 minutes. Mooney scorch was measured at 125° C. with the use of an Alpha Technologies MV 2000 according to ASTM 1646. The tc90 times were determined according to ASTM D-5289 with the use of a Moving Die Rheometer (MDR 2000E) using a frequency of oscillation of 1.7 Hz and a 1° arc at 160° C. for 30 minutes total run time. Curing was achieved with the use of an Electric Press equipped with an Allan-Bradley Programmable Controller.

Examples

The examples were prepared, according to the formulations given in Table 1, with the use of a 1.6 L Banbury (BR-82) internal mixer equipped with intermeshing rotors. The Mokon temperature was first allowed to stabilize at 30° C. With the rotor speed set at 77 rpm, the elastomers (1A) were introduced into the mixer. After 0.5 minutes, the silica and liquid modifiers (1B) were added to the mixer. After 2 minutes, the carbon black (1C) was added. Following a ram bump at 3.5 minute, the remainder of the ingredients (1 D) was added at the 3.5 minute mark. The compound was dumped after a total mix time of 6 minutes. The curatives (2A) were then added on a RT, 10"×20" two-roll mill.

TABLE 1

Example 1-6 Formulations:

| | Tag | Example 1 | Example 2 | Example 3 | Example 4 | Example 5 | Example 6 |
| --- | --- | --- | --- | --- | --- | --- | --- |
| Bromobutyl 2030 | 1A | 50 | 50 | 50 | 50 | 50 | 50 |
| Buna CB 25 | 1A | 50 | 50 | 50 | 50 | 50 | 50 |
| HiSil 233 | 1B | 30 | 30 | 30 | 30 | 30 | 30 |
| DMAE | 1B | 1.4 | 1.4 | 1.4 | 1.4 | 1.4 | 1.4 |
| HMDZ | 1B | | 0.73 | | | | |
| 4050E | 1B | | | 1 | 4 | | |
| V100 | 1B | | | | | 1 | 4 |
| Carbon Black N234 | 1C | 50 | 50 | 50 | 50 | 50 | 50 |
| Stearic Acid | 1C | 1 | 1 | 1 | 1 | 1 | 1 |
| Calsol 8240 | 1D | 7.5 | 7.5 | 7.5 | 7.5 | 7.5 | 7.5 |
| Sunolite 160 Prills | 1D | 0.75 | 0.75 | 0.75 | 0.75 | 0.75 | 0.75 |
| Vulkanox 4020 LG | 1D | 0.5 | 0.5 | 0.5 | 0.5 | 0.5 | 0.5 |
| Vulkanox HS/LG | 1D | 0.5 | 0.5 | 0.5 | 0.5 | 0.5 | 0.5 |
| Sulfur NBS | 2A | 1 | 1 | 1 | 1 | 1 | 1 |
| Vulkacit CZ/EG-C | 2A | 1 | 1 | 1 | 1 | 1 | 1 |
| Zinc Oxide | 2A | 2 | 2 | 2 | 2 | 2 | 2 |

Figure 2:
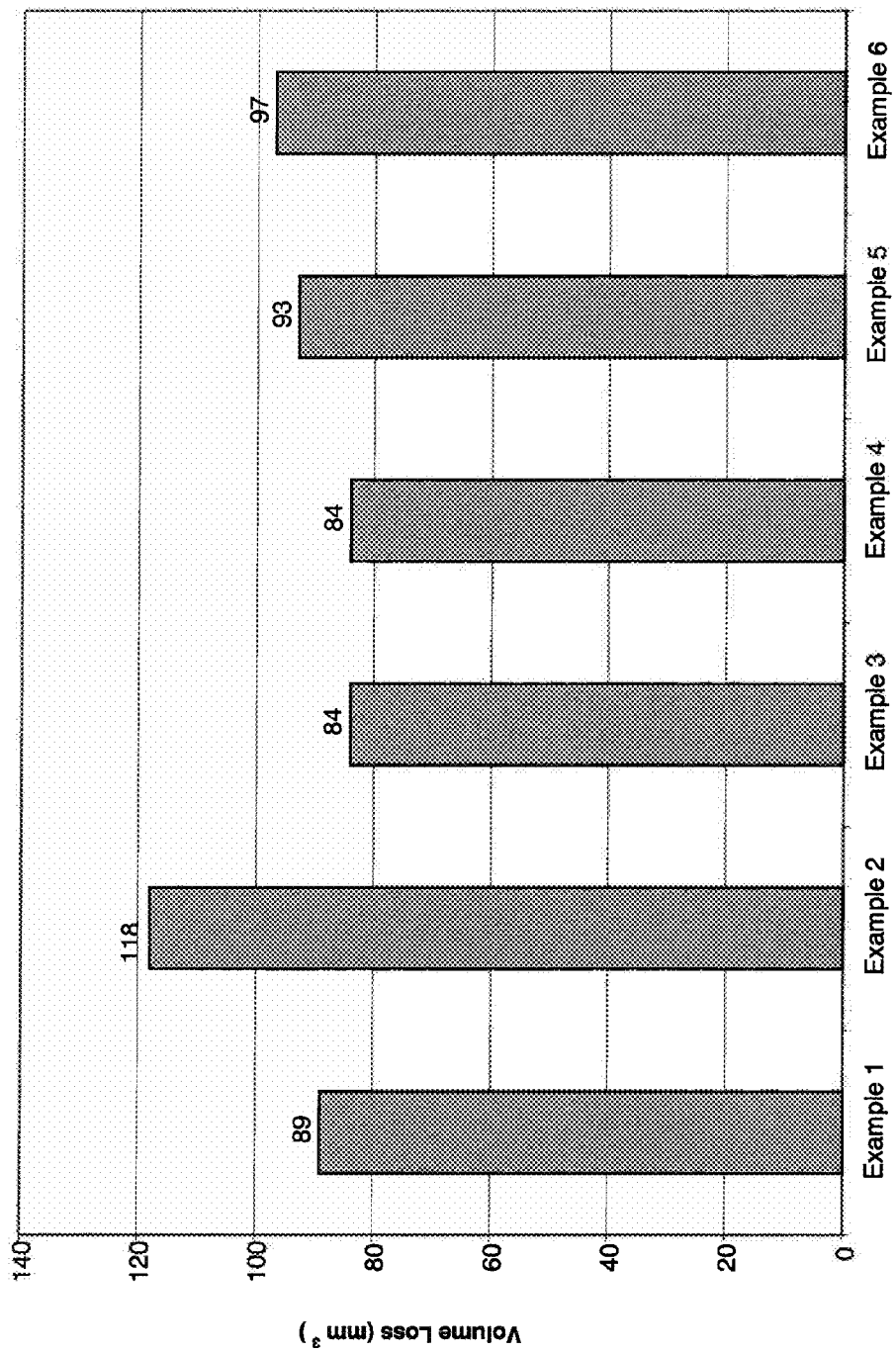
FIG. 2 is a graph of the DIN Abrasion Volume Loss of comparative filled elastomeric compounds and filled compounds according to the present invention.

It has previously been shown that the addition of aminoalcohols such as DMAE (Example 1) effectively compatibilizes BIIR and silica allowing for the production of BIIR containing tread compounds with amiable physical properties (Table 2, FIGS. 1 and 2). However, the use of DMAE alone detracts from the overall processability of the resulting formulation. As can be seen from FIG. 1, the t05 time (measured at 125° C.) observed for Example 1 was found to be prohibitively low. Then, the positive effect of HMDZ (Example 2) on the scorch safety of BIIR-containing silica tread compounds was discovered. While the Mooney scorch times determined for these compounds were acceptable, a practical need to identify less volatile alternatives to HMDZ remains. Specifically, the low volatility of HMDZ along with the extremely low flash point (ca. 8° C.) prohibits the use of this modifier in an industrial arena.

As a result, oligomeric polyol modifiers according to the present invention have been identified as suitable replacements for HMDZ. As can be seen from the data garnished from Examples 3 and 4 (see Table 2, FIGS. 1 and 2), the use of either 4050E or V100 in place of HMDZ results in compounds whose physical properties are similar to those previously observed for the comparative DMAE/HMDZ example (Example 2). Importantly, both 4050E and V100 are extremely involatile and should pose no flammability risk in an industrial environment.

As exemplified in Table 2, there appears to be an optimum level between 0.1 and 1 phr at which certain of the modifiers (such as 4050E and V100) should be introduced into the BIIR-silica formulation.

TABLE 2

| Tensile Properties of Examples 1-6 | | | | | | |
|---|---|---|---|---|---|---|
| | Example 1 | Example 2 | Example 3 | Example 4 | Example 5 | Example 6 |
| Hardness Shore A (pts.) | 64 | 65 | 65 | 63 | 65 | 63 |
| Ultimate Tensile (MPa) | 14.7 | 14.1 | 14.9 | 14.8 | 15.9 | 15.6 |
| Ultimate Elongation (%) | 414 | 423 | 421 | 402 | 439 | 414 |
| Stress @ 25% (MPa) | 1.5 | 1.2 | 1.6 | 1.4 | 1.5 | 1.3 |
| Stress @ 50% (MPa) | 2 | 1.7 | 2.1 | 1.9 | 1.9 | 1.9 |
| Stress @ 100% (MPa) | 3.2 | 2.9 | 3.5 | 3.2 | 3.2 | 3.2 |
| Stress @ 200% (MPa) | 6.5 | 6.2 | 6.7 | 6.8 | 6.6 | 6.7 |
| Stress @ 300% (MPa) | 10.6 | 10.2 | 10.8 | 11.2 | 10.9 | 11.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a filled halobutyl elastomer comprising:
   admixing
   (a) at least one halobutyl elastomer,
   (b) at least one mineral filler, and
   (c) at least one oligomeric polyol compound selected from the group consisting of polypropylene oxide derivatives of trimethylolpropane and polypropylene oxide derivatives of ethylene diamine, and an additive which contains at least one hydroxyl group and at least one functional group having a basic amine group, and
   curing the resulting filled halobutyl elastomer mixture.

2. The process according to claim 1, wherein the mineral filler is silica, silicate, clay, gypsum, alumina, titanium dioxide, talc or a mixture thereof.

3. The process according to claim 1, wherein the halogenated butyl elastomer is a brominated butyl elastomer.

4. The process according to claim 1, wherein the additive is monoethanolamine or N,N-dimethyaminoalcohol.

5. The process according to claim 1, wherein the amount of filler is in the range from 20 parts to 250 parts by weight, per hundred parts of elastomer.

6. The process according to claim 1, wherein the amount of oligomeric polyol is in the range of from 0.1 to 4 parts per hundred parts of elastomer.

7. The process according to claim 1, wherein the amount of additive used in conjunction with the oligomeric polyol compound is in the range of from 0.5 to 10 parts per hundred parts of elastomer.

8. The process according to claim 1, further comprising admixing
   (d) an additional elastomer, prior to curing.

9. A filled halobutyl elastomer composition comprising at least one halobutyl elastomer, at least one mineral filler and at least one oligomeric polyol compound selected from the group consisting of polypropylene oxide derivatives of trimethylolpropane and polypropylene oxide derivatives of ethylene diamine, and an additive which contains at least one hydroxyl group and at least one functional group having a basic amine group.

10. The composition according to claim 9, wherein the mineral filler is silica, silicate, clay, gypsum, alumina, titanium dioxide, talc or a mixture thereof.

11. The composition according to claim 9, wherein the halogenated butyl elastomer is a brominated butyl elastomer.

12. The composition according to claim 9, wherein the additive is monoethanolamine or N,N-dimethyaminoalcohol.

13. The composition according to claim 9, wherein the amount of filler is in the range from 20 parts to 250 parts by weight, per hundred parts of elastomer.

14. The composition according to claim 9, wherein the amount of oligomeric polyol is in the range of from 0.1 to 4 parts per hundred parts of elastomer.

15. The composition according to claim 9, wherein the amount of additive used in conjunction with the oligomeric polyol compound is in the range of from 0.5 to 10 parts per hundred parts of elastomer.

16. The composition according to claim 9, wherein the filled, cured halobutyl elastomer is a tire tread.

\* \* \* \* \*

UNITED STATES PATENT AND TRADEMARK OFFICE
CERTIFICATE OF CORRECTION

| | | |
|---|---|---|
| PATENT NO. | : 8,084,526 B2 | Page 1 of 1 |
| APPLICATION NO. | : 12/779569 | |
| DATED | : December 27, 2011 | |
| INVENTOR(S) | : Rui Resendes and Kevin Kulbaba | |

It is certified that error appears in the above-identified patent and that said Letters Patent is hereby corrected as shown below:

Title Page, should read

In the assignee name; item (73),

LANXESS Inc.

Signed and Sealed this
Third Day of April, 2012

David J. Kappos
*Director of the United States Patent and Trademark Office*